United States Patent
Shin et al.

(10) Patent No.: US 10,396,559 B2
(45) Date of Patent: Aug. 27, 2019

(54) APPARATUS FOR MANAGING VOLTAGE STABILITY OF ELECTRICAL POWER GRID AND METHOD THEREFOR

(71) Applicant: Korea Electric Power Corporation, Jeollanam-do (KR)

(72) Inventors: Jeong-Hoon Shin, Daejeon (KR); Su-Chul Nam, Daejeon (KR); Ji-Young Song, Daejeon (KR); Seung-Mook Baek, Sejong-si (KR)

(73) Assignee: Korea Electric Power Corporation, Jeollanam-Do (KR)

( * ) Notice: Subject to any disclaimer, the term of this patent is extended or adjusted under 35 U.S.C. 154(b) by 153 days.

(21) Appl. No.: 15/507,626

(22) PCT Filed: Jun. 2, 2015

(86) PCT No.: PCT/KR2015/005529
§ 371 (c)(1),
(2) Date: Feb. 28, 2017

(87) PCT Pub. No.: WO2016/035978
PCT Pub. Date: Mar. 10, 2016

(65) Prior Publication Data
US 2017/0302078 A1    Oct. 19, 2017

(30) Foreign Application Priority Data
Sep. 4, 2014   (KR) .................. 10-2014-0117674

(51) Int. Cl.
*H02H 9/08*    (2006.01)
*H02J 3/24*    (2006.01)
(Continued)

(52) U.S. Cl.
CPC .................. *H02J 3/16* (2013.01); *H02J 3/24* (2013.01); *H02P 9/105* (2013.01); *Y02E 40/34* (2013.01)

(58) Field of Classification Search
CPC ............. H02P 9/105; Y02E 40/34; H02J 3/24
See application file for complete search history.

(56) References Cited

U.S. PATENT DOCUMENTS 6,609,361 B2 *  8/2003  Vugdelija ............. F01K 23/101
                                                          60/39.182
7,898,099 B2 *  3/2011  Stiesdal ................ F03D 7/0284
                                                          290/44
(Continued)

FOREIGN PATENT DOCUMENTS

JP      2012-170167 A     9/2012
KR   10-2003-0083798 A    11/2003
(Continued)

OTHER PUBLICATIONS

Written Opinion and International Search Report dated Aug. 24, 2015 issued in International Patent Application No. PCT/KR2015/005529 (English translation).

*Primary Examiner* — Alfonso Perez Borroto
*Assistant Examiner* — Esayas G Yeshaw
(74) *Attorney, Agent, or Firm* — Morgan, Lewis & Bockius LLP

(57) ABSTRACT

The present invention relates to an apparatus for managing voltage stability of an electrical power grid and a method therefor. The apparatus includes: a fast response type voltage control unit generating reactive power output ratio information by using voltage information received from a plurality of target buses; a reactive power distribution unit generating reactive power reference information based on the reactive power output ratio information, and generating end voltage adjustment information by using the reactive power reference information; an end voltage adjustment unit adjusting an end voltage by using the end voltage adjustment information; a transient reduction control unit generating an auxiliary signal when a frequency is changed, and providing (Continued)

the auxiliary signal to the reactive power distribution unit; and a voltage adjustment control unit generating an additional auxiliary signal by measuring voltages of the target buses, and providing the additional auxiliary signal to the end voltage adjustment unit.

7 Claims, 6 Drawing Sheets

(51) Int. Cl.
 *H02J 3/04* (2006.01)
 *H02J 3/16* (2006.01)
 *H02P 9/10* (2006.01)

(56) References Cited

U.S. PATENT DOCUMENTS

| | | | | |
|---|---|---|---|---|
| 7,915,762 | B2* | 3/2011 | Helle | F03D 7/0284 |
| | | | | 307/87 |
| 2007/0266423 | A1* | 11/2007 | Tehee, Jr. | F03D 7/028 |
| | | | | 726/3 |
| 2008/0150283 | A1* | 6/2008 | Rivas | H02J 3/1885 |
| | | | | 290/44 |
| 2010/0052322 | A1* | 3/2010 | Fortmann | F03D 7/0272 |
| | | | | 290/44 |
| 2011/0057445 | A1* | 3/2011 | Acedo Sanchez | F03D 7/0224 |
| | | | | 290/44 |
| 2012/0136643 | A1* | 5/2012 | Venkatasubramanian | |
| | | | | H02J 3/18 |
| | | | | 703/18 |
| 2014/0091630 | A1* | 4/2014 | Kim | H02J 3/36 |
| | | | | 307/82 |
| 2015/0001931 | A1* | 1/2015 | Banham-Hall | H02J 3/386 |
| | | | | 307/24 |
| 2015/0016159 | A1* | 1/2015 | Deboy | H02J 3/383 |
| | | | | 363/71 |
| 2015/0288220 | A1* | 10/2015 | Gurunathan | G06F 1/26 |
| | | | | 307/65 |
| 2017/0250534 | A1* | 8/2017 | Yu | H02J 3/18 |

FOREIGN PATENT DOCUMENTS

| | | |
|---|---|---|
| KR | 10-2005-0107972 A | 11/2005 |
| KR | 10-2011-0035657 A | 4/2011 |
| KR | 10-1039431 B1 | 6/2011 |
| KR | 10-1126174 B1 | 6/2012 |

* cited by examiner

APPARATUS FOR MANAGING VOLTAGE STABILITY OF ELECTRICAL POWER GRID AND METHOD THEREFOR

CROSS REFERENCE

This patent application is the U.S. National Phase under 35 U.S.C. § 371 of International Application No. PCT/KR2015/005529, filed on Jun. 2, 2015, which claims the benefit of Korean Patent Application No. 10-2014-0117674, filed on Sep. 4, 2014, the entire contents of each are hereby incorporated by reference.

TECHNICAL FIELD

The present invention relates to an apparatus for managing voltage stability of an electrical power grid and a method therefor. More particularly, the present invention relates to an apparatus for managing voltage stability of an electrical power grid and a method therefor, the apparatus including both a transient reduction control unit reducing a change of a frequency and a voltage adjustment control unit reducing a change of voltage.

Further, this application claims the benefit of Korean Patent Application No. 10-2014-0117674, filed Sep. 4, 2014, which is hereby incorporated by reference in its entirety into this application.

BACKGROUND ART

A voltage management system (VMS) is a control system enhancing voltage stability of an electrical power grid by using generators of the electrical power grid. Each of the generators distributes reactive power generation on the basis of each generator's own ability to generate power. The voltage management system calculates electrical distances to buses of the electrical power grid, and selects target buses for measuring changes of all voltages. That is, the voltage management system controls the reactive power generation of the generators so as to maintain levels of voltages of the target buses.

In order to control reactive power generation, the voltage management system includes a fast response type voltage control unit (continuous voltage controller: CVC), a static voltage control unit (discrete voltage controller: DVC), and a reactive power distributor (reactive power dispatcher: RPD).

The fast response type voltage control unit and the static voltage control unit respectively generate a control signal controlling reactive power of the generator and a control signal controlling reactive power of phase modifying equipment. The fast response type voltage control unit provides a reference value of the reactive power generation, which is required to be outputted by each of the generators, by using voltage differences of the target buses. The reference value of the reactive power generation is provided to an automatic voltage adjustment device (automatic voltage regulator: AVR) by being converted through the reactive power distributor mounted in the generator. The automatic voltage adjustment device controls the reactive power generation of the generators by using a signal received from the reactive power distributor. That is, the voltage management system distributes the reactive power by being connected to the electrical power grid online, thereby enhancing voltage stability.

However, without the voltage management system, the generators output reactive power by using respective automatic voltage adjustment devices. Therefore, the generators output generated reactive power that is completely unrelated to the control signals of the voltage management system. Therefore, in a conventional case, when the voltage management system is initially applied to the electrical power grid or the voltage management system is replaced, it is required to set a reference value of an initial reactive power generation, otherwise, a transient phenomena occurs in the electrical power grid.

In addition, when the voltage management system is manually operated, it is difficult to provide an optimum control signal to the electrical power grid.

In this regard, there is Korean Patent Application Publication No. 10-2005-0107972, titled "System and method for calculating real-time voltage stability risk index in power system using time series data."

DISCLOSURE

Technical Problem

The present invention has been proposed to solve the problems in the related art. The present invention is intended to provide an apparatus for managing voltage stability of an electrical power grid and a method therefor, the apparatus including a transient reduction control unit, wherein the transient reduction control unit generates an auxiliary signal when a frequency is changed, and provides the auxiliary signal to a reactive power distribution unit, thereby reducing a change of the frequency in the case of disturbance.

In addition, the present invention is intended to provide an apparatus for managing voltage stability of an electrical power grid and a method therefor, the apparatus including a voltage adjustment control unit, wherein the voltage adjustment control unit measures voltages of target buses, and generates an additional auxiliary signal when the measured voltages of the target buses are changed to be equal to or greater than a preset reference voltage, and provides the additional auxiliary signal to an automatic voltage adjustment unit, thereby reducing a change of voltage.

Technical Solution

In order to accomplish the above object, the present invention provides An apparatus for managing voltage stability of an electrical power grid, the apparatus including: a fast response type voltage control unit generating reactive power output ratio information by using voltage information received from a plurality of target buses; a reactive power distribution unit generating reactive power reference information based on the reactive power output ratio information, and generating end voltage adjustment information by using the reactive power reference information; an end voltage adjustment unit adjusting an end voltage by using the end voltage adjustment information; a transient reduction control unit generating an auxiliary signal when a frequency is changed, and providing the auxiliary signal to the reactive power distribution unit; and a voltage adjustment control unit generating an additional auxiliary signal by measuring voltages of the target buses, and providing the additional auxiliary signal to the end voltage adjustment unit.

In addition, the fast response type voltage control unit may generate a proportional coefficient by calculating sensitivity between reactive power and the voltages of the target buses, may generate an integral coefficient by using the proportional coefficient and an integral time, and may generate a differential coefficient by using the integral coefficient and a differential time.

In addition, the fast response type voltage control unit may generate the reactive power output ratio information by using voltage comparison information, the proportional coefficient, the integral coefficient, and the differential coefficient.

In addition, the transient reduction control unit may generate the auxiliary signal by receiving a frequency deviation when the frequency of the electrical power grid is changed, the auxiliary signal being applied to the reactive power distribution unit to correct the frequency deviation.

In addition, the voltage adjustment control unit may generate the additional auxiliary signal when the measured voltages of the target buses are changed to be equal to or greater than a preset reference voltage, the additional auxiliary signal being applied to the end voltage adjustment unit to correct the changes of the measured voltages.

In order to accomplish the above object, the present invention provides a method for managing voltage stability of an electrical power grid, the method including: generating, by a fast response type voltage control unit, reactive power output ratio information by using voltage information received from a plurality of target buses; generating, by a reactive power distribution unit, reactive power reference information based on the reactive power output ratio information, and generating end voltage adjustment information by using the reactive power reference information; adjusting, by an end voltage adjustment unit, an end voltage by using the end voltage adjustment information; generating, by a transient reduction control unit, an auxiliary signal when a frequency is changed, and providing the auxiliary signal to the reactive power distribution unit; and generating, by a voltage adjustment control unit, an additional auxiliary signal by measuring voltages of the target buses, and providing the additional auxiliary signal to the end voltage adjustment unit.

In addition, the generating of the reactive power output ratio information by using the voltage information received from the plurality of target buses may include: generating a proportional coefficient by calculating sensitivity between reactive power and the voltages of the target buses; generating an integral coefficient by using the proportional coefficient and an integral time; generating a differential coefficient by using the integral coefficient and a differential time; and generating the reactive power output ratio information by using voltage comparison information, the proportional coefficient, the integral coefficient, and the differential coefficient.

In addition, the generating of the auxiliary signal when the frequency is changed, and the providing of the auxiliary signal to the reactive power distribution unit may include: generating the auxiliary signal by receiving a frequency deviation when the frequency of the electrical power rid is changed, the auxiliary signal being applied to the reactive power distribution unit to correct the frequency deviation.

In addition, the generating of the additional auxiliary signal by measuring the voltages of the target buses and the providing of the additional auxiliary signal to the end voltage adjustment unit may include: generating the additional auxiliary signal when the measured voltages of the target buses are changed to be equal to or greater than a preset reference voltage, the additional auxiliary signal being applied to the end voltage adjustment unit to correct the changes of the measured voltages.

Advantageous Effects

According to the above-mentioned apparatus for managing voltage stability of an electrical power grid and method therefor, the apparatus includes the transient reduction control unit, wherein the transient reduction control unit generates the auxiliary signal when the frequency is changed, and provides the auxiliary signal to the reactive power distribution unit, thereby reducing a change of the frequency in the case of disturbance.

In addition, the apparatus includes the voltage adjustment control unit measuring the voltages of the target buses, and generating the additional auxiliary signal when the measured voltages of the target buses are changed to be equal to or greater than a preset reference voltage, and providing the additional auxiliary signal to an automatic voltage adjustment unit, thereby reducing a change of the voltage.

MODE FOR INVENTION

Figure 1:
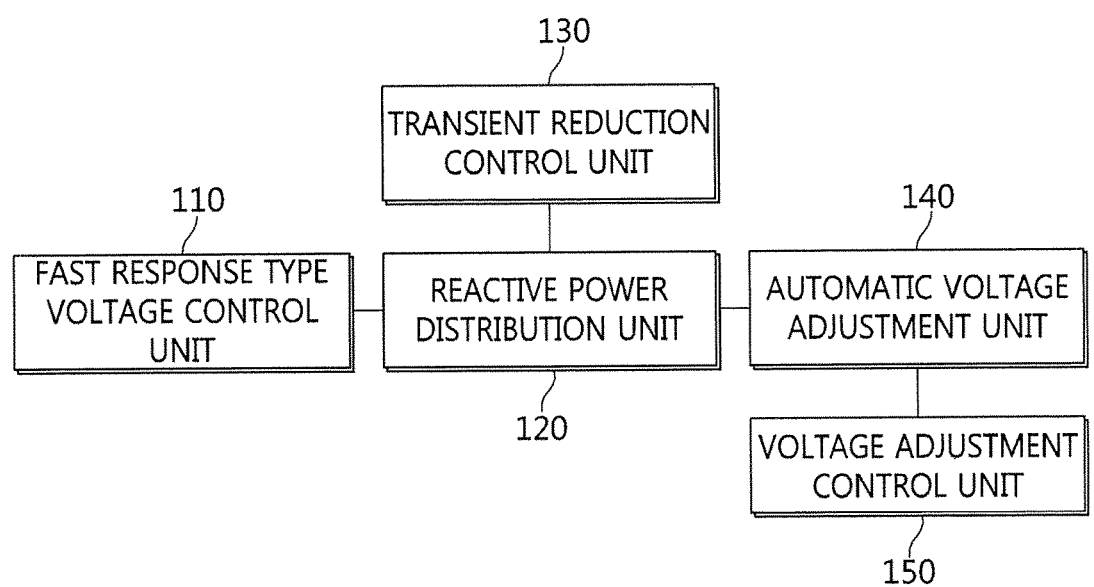
FIG. 1 is a view for describing a configuration of an apparatus for managing voltage stability of an electrical power grid according to an embodiment of the present invention.

Hereinafter, the most preferred embodiment of the present invention will be described with reference to the accompanying drawings in order to describe the present invention in detail so that the technical spirit of the present invention can be easily embodied by those skilled in the art to which the present invention belongs. First, it is to be noted that in assigning reference numerals to elements in the drawings, the same reference numerals designate the same elements throughout the drawings although the elements are shown in different drawings. In addition, in the description of the present disclosure, the detailed descriptions of known related constitutions or functions thereof may be omitted if they make the gist of the present invention unclear.

Hereinafter, an apparatus for managing voltage stability of an electrical power grid and a method therefor according to an embodiment of the present invention will be described.

FIG. 1 is a view for describing a configuration of the apparatus for managing voltage stability of an electrical power grid according to the embodiment of the present invention.

Referring to FIG. 1, the apparatus 100 for managing voltage stability of an electrical power grid includes a fast response type voltage control unit 110, a reactive power distribution unit 120, a transient reduction control unit 130, an automatic voltage adjustment unit 140 functioning as an end voltage adjustment unit, and a voltage adjustment control unit 150.

The fast response type voltage control unit 110 generates reactive power output ratio information by using voltage information received from a plurality of target buses. The fast response type voltage control unit 110 generates a proportional coefficient by calculating sensitivity between reactive power and voltages of the target buses, generates an integral coefficient by using the proportional coefficient and an integral time, and generates a differential coefficient by using the integral coefficient and a differential time. Therefore, the fast response type voltage control unit 110 generates the reactive power output ratio information by using voltage comparison information, the proportional coefficient, the integral coefficient, and the differential coefficient.

The reactive power distribution unit 120 generates reactive power reference information based on the reactive power output ratio information, and generates end voltage adjustment information by using the reactive power reference information.

The end voltage adjustment unit 140 adjusts an end voltage by using the end voltage adjustment information.

The transient reduction control unit 130 generates an auxiliary signal when a frequency is changed, and provides the auxiliary signal to the reactive power distribution unit 120. The transient reduction control unit 130 generates the auxiliary signal by receiving a frequency deviation when the frequency of the electrical power grid is changed. The auxiliary signal is applied to the reactive power distribution unit 120 to correct the frequency deviation.

The voltage adjustment control unit 150 generates an additional auxiliary signal by measuring voltages of the target buses, and provides the additional auxiliary signal to the end voltage adjustment unit 140. The voltage adjustment control unit 150 generates the additional auxiliary signal when the measured voltages of the target buses are changed to be equal to or greater than a preset reference voltage. The additional auxiliary signal is applied to the end voltage adjustment unit 140 to correct the changes of the measured voltage.

Figure 2:
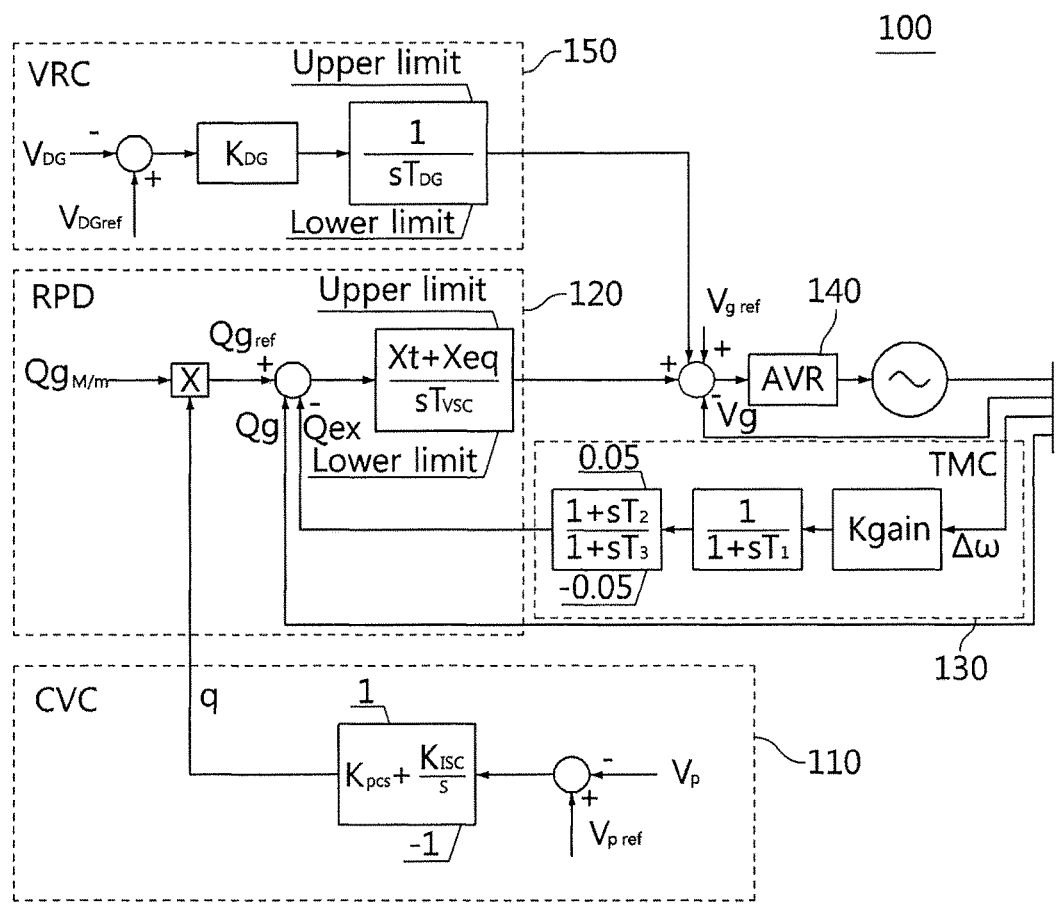
FIG. 2 is a view for describing a circuit configuration of the apparatus for managing voltage stability of an electrical power grid according to an embodiment of the present invention.

FIG. 2 is a view for describing a circuit configuration of the apparatus for managing voltage stability of the electrical power grid according to an embodiment of the present invention.

Referring to FIG. 2, the reactive power distribution unit 120 (RPD) is designed with the transient reduction control unit 130 (TMS) providing the auxiliary signal. The transient reduction control unit 130 outputs '0' in a normal state. However, when the frequency of the electrical power grid is changed due to disturbance, the transient reduction control unit generates the auxiliary signal, and provides the auxiliary signal to the reactive power distribution unit. Therefore, it is possible to restrict the reactive power distribution unit 120 from increasing the disturbance. That is, when the frequency deviation occurs due to the disturbance, the transient reduction control unit 130 generates the auxiliary signal to have a phase opposite to a phase of vibration, thereby restraining the frequency deviation. The auxiliary signal is generated through a gain generator, a low frequency band pass filter, and a phase compensator that are included in the transient reduction control unit 130. A gain Kgain generated by the gain generator is used to improve a function for enhancing transient stability by amplifying the frequency deviation. A filter integer $T_1$ used at the low frequency band pass filter is an integer for avoiding an operation relative to the frequency deviation in the normal state. $T_2$ and $T_3$ that are used at the phase compensator are the most important integers for the performance of the transient reduction control unit, and thus, it is desired to properly select $T_2$ and $T_3$ depending on characteristics of the electrical power grid.

In addition, the end voltage adjustment unit 140 (AVR) is designed with the voltage adjustment control unit 150 (VRC) providing the additional auxiliary signal. The voltage adjustment control unit 150 measures voltage of the target bus, and generates the additional auxiliary signal when the measured voltage of the target bus is changed to be equal to or greater than a preset reference voltage. The voltage adjustment control unit restricts the measured voltage to be within the preset reference voltage by adjusting voltage of the end voltage adjustment unit 140. At the voltage adjustment control unit 150, $K_{DG}$ amplifies a voltage deviation of the connection bus of the distributed power supply. $T_{DG}$ is an integer used in integration, and determines how fast an error is integrated and is applied to the end voltage adjustment unit 140.

Figure 3:
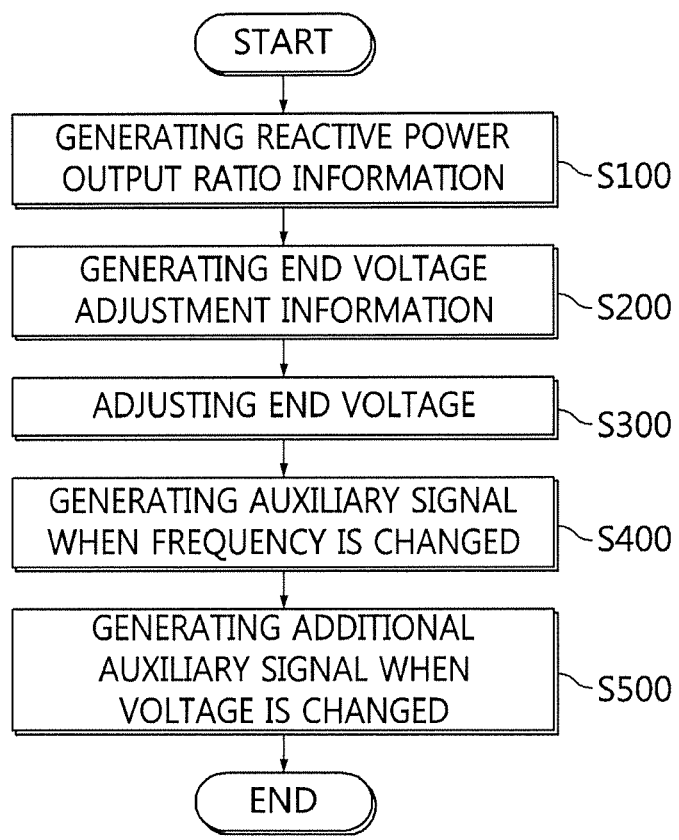
FIG. 3 is a view for describing a process of a method for managing voltage stability of an electrical power grid according to an embodiment of the present invention.

FIG. 3 is a view for describing a process of a method for managing voltage stability of an electrical power grid according to an embodiment of the present invention.

Referring to FIG. 3, since the method for managing voltage stability of an electrical power grid uses the above-described apparatus for managing voltage stability of an electrical power grid, a repeated description will be omitted hereinafter.

First, the fast response type voltage control unit generates the reactive power output ratio information by using the voltage information received from the plurality of the target buses at step S100. Here, the generating of the reactive power output ratio information by using the voltage information received from the plurality of the target buses at step S100 includes: generating the proportional coefficient by calculating sensitivity between reactive power and the voltages of the target buses; generating the integral coefficient by using the proportional coefficient and the integral time; generating the differential coefficient by using the integral coefficient and the differential time; and generating the reactive power output ratio information by using the voltage comparison information, the proportional coefficient, the integral coefficient, and the differential coefficient.

Second, the reactive power distribution unit generates the reactive power reference information based on the reactive power output ratio information, and generates the end voltage adjustment information by using the reactive power reference information at step S200.

Third, the end voltage adjustment unit adjusts the end voltage by using the end voltage adjustment information at step S300.

Fourth, the transient reduction control unit generates the auxiliary signal when the frequency is changed, and provides the auxiliary signal to the reactive power distribution unit at step S400. The generating of the auxiliary signal when the frequency is changed, and the providing of the auxiliary signal to the reactive power distribution unit at step S400 include: generating the auxiliary signal by receiving the frequency deviation when the frequency of the electrical power rid is changed, the auxiliary signal being applied to the reactive power distribution unit to correct the frequency deviation.

Fifth, the voltage adjustment control unit generates the additional auxiliary signal by measuring the voltages of the target buses, and provides the additional auxiliary signal to the end voltage adjustment unit at step S500. The generating of the additional auxiliary signal by measuring the voltages of the target buses and the providing of the additional auxiliary signal to the end voltage adjustment unit at step S500 include: generating the additional auxiliary signal when the measured voltages of the target buses are changed to be equal to or greater than a preset reference voltage, the additional auxiliary signal being applied to the end voltage adjustment unit to correct the changes of the measured voltages.

Figure 4:
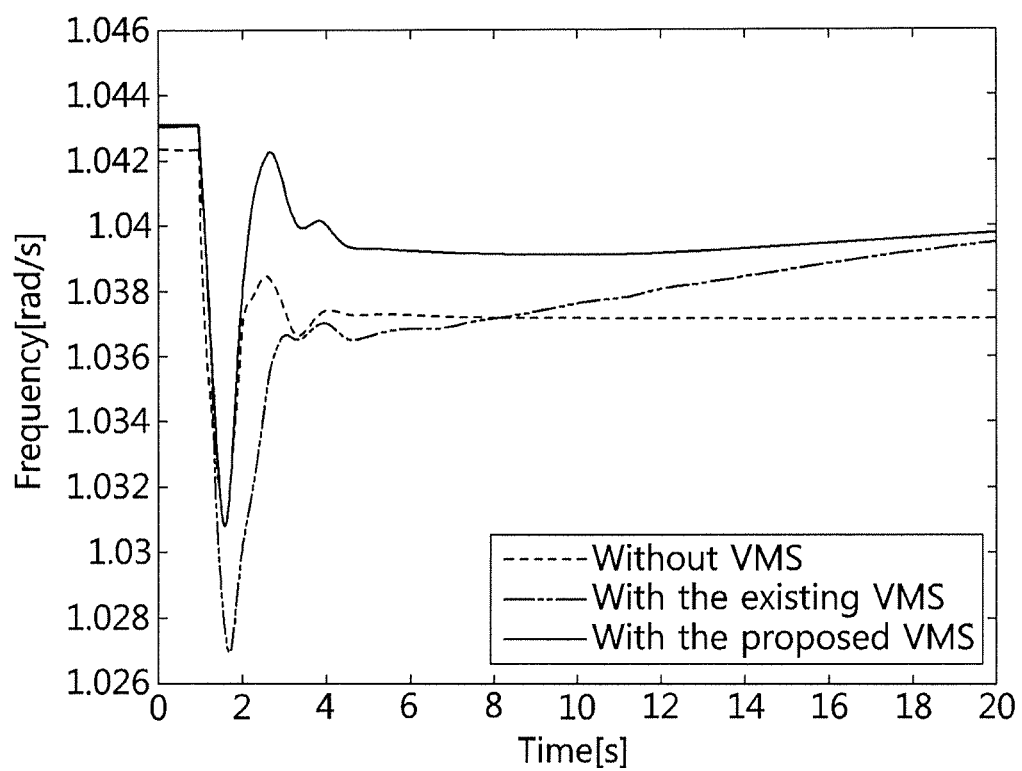
FIG. 4 is a view for describing change characteristics of voltage of a target bus caused by the apparatus for managing voltage stability of an electrical power grid and the method therefor according to an embodiment of the present invention.
Figure 5:
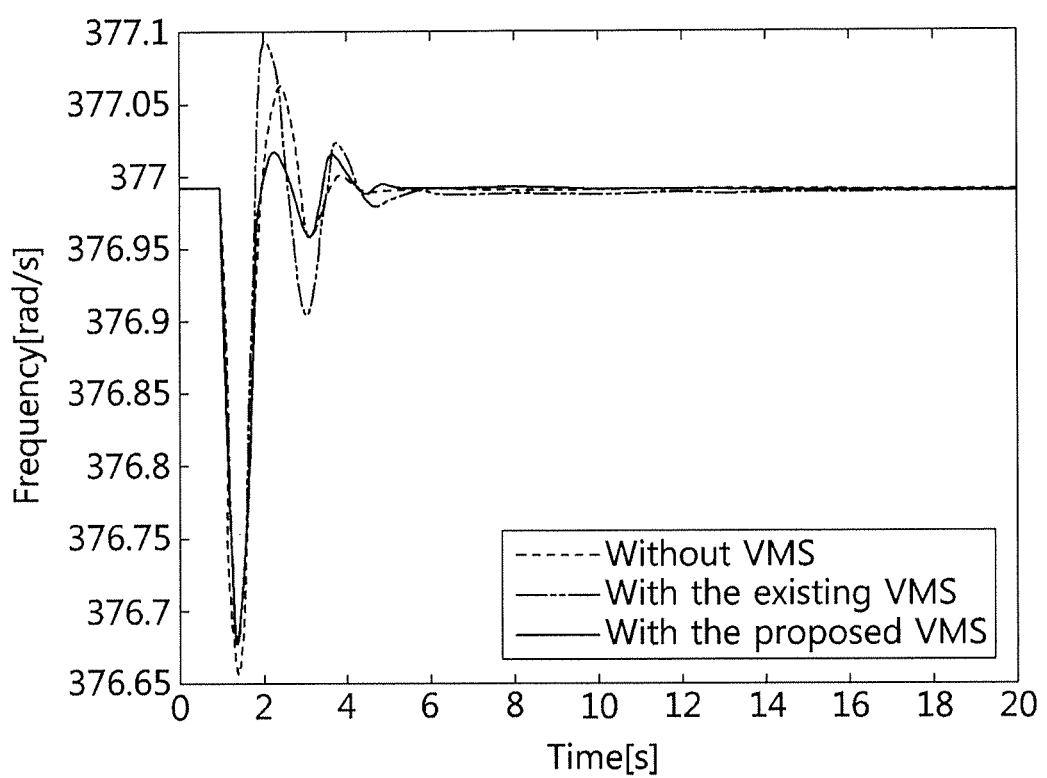
FIG. 5 is a view for describing change characteristics of voltage of a frequency of the electrical power grid caused by the apparatus for managing voltage stability of an electrical power grid and the method therefor according to an embodiment of the present invention.
Figure 6:
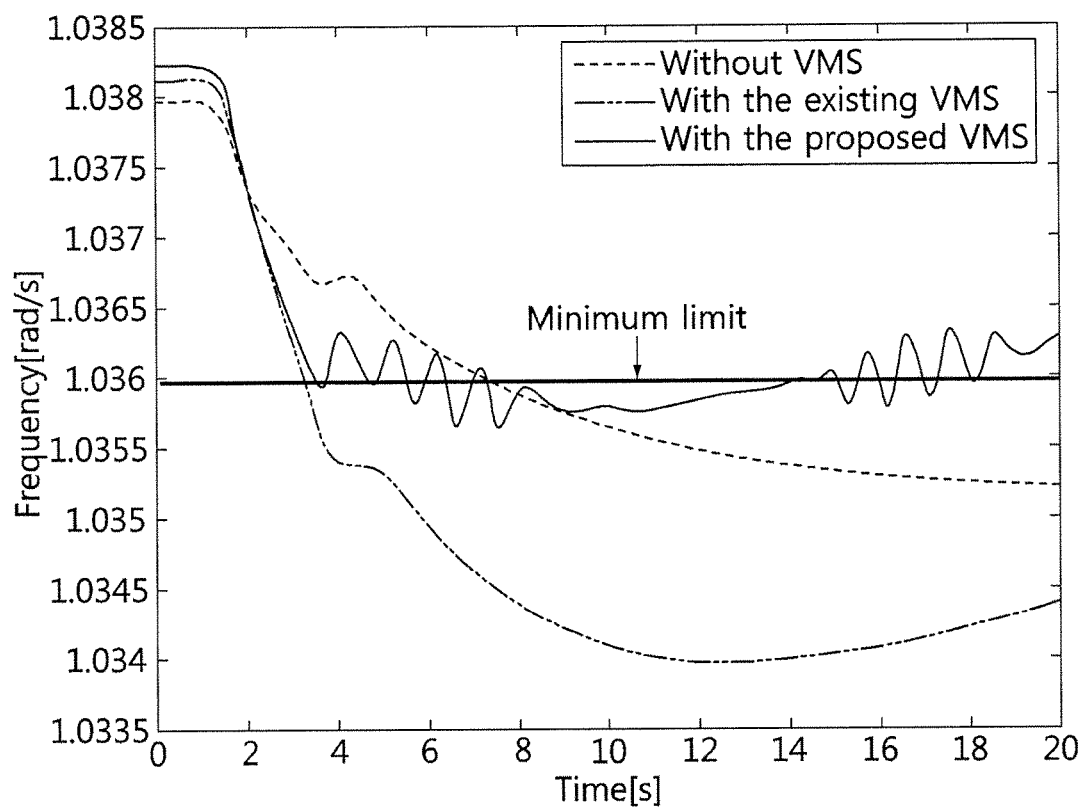
FIG. 6 is a view for describing change characteristic of voltage of a connection bus of a distributed power supply caused by the apparatus for managing voltage stability of an electrical power grid and the method therefor according to an embodiment of the present invention.

FIG. 4 is a view for describing change characteristics of voltage of a target bus caused by the apparatus for managing voltage stability of an electrical power grid and the method therefor according to an embodiment of the present invention. FIG. 5 is a view for describing change characteristics of voltage of a frequency of the electrical power grid caused by the apparatus for managing voltage stability of an electrical power grid and the method therefor according to an embodiment of the present invention. FIG. 6 is a view for describing change characteristic of voltage of a connection bus of a distributed power supply caused by the apparatus for managing voltage stability of an electrical power grid and the method therefor according to an embodiment of the present invention.

FIGS. 4 and 5 respectively show voltage change of the target bus and voltage change of the frequency of the electrical power grid in the case of the disturbance. As shown in FIGS. 4 and 5, when using the apparatus for managing voltage stability (the proposed VMS), the voltage is stabilized. In addition, FIG. 6 shows voltage change of the connection bus caused by output change of the distributed power supply.

As shown in FIG. 6, when using the apparatus for managing voltage stability (the proposed VMS), the voltage of the connection bus is maintained within the preset reference voltage. In conclusion, the present invention has an improved performance in terms of transient stability and voltage stability.

According to the above-mentioned apparatus for managing voltage stability of the electrical power grid and method therefor, the apparatus includes the transient reduction control unit, wherein the transient reduction control unit generates the auxiliary signal when the frequency is changed, and provides the auxiliary signal to the reactive power distribution unit, thereby reducing a change of the frequency in the case of disturbance.

In addition, the apparatus includes the voltage adjustment control unit measuring the voltages of the target buses, and generating the additional auxiliary signal when the measured voltages of the target buses are changed to be equal to or greater than a preset reference voltage, and providing the additional auxiliary signal to the automatic voltage adjustment unit, thereby reducing a change of the voltage.

Although the preferred embodiments of the present invention have been disclosed for illustrative purposes, those skilled in the art will appreciate that various modifications and changes are possible, without departing from the scope and spirit of the invention as disclosed in the accompanying claims.

The invention claimed is:

1. An apparatus for managing voltage stability of an electrical power grid, the apparatus comprising:
a fast response type voltage control circuit generating reactive power output ratio information by using voltage information received from a plurality of target buses;
a reactive power distribution circuit generating reactive power reference information based on the reactive power output ratio information, and generating end voltage adjustment information by using the reactive power reference information;
an end voltage adjustment circuit adjusting an end voltage by using the end voltage adjustment information;
a transient reduction control circuit generating an auxiliary signal when a frequency is changed, and providing the auxiliary signal to the reactive power distribution circuit; and
a voltage adjustment control circuit generating an additional auxiliary signal by measuring voltages of the target buses, and providing the additional auxiliary signal to the end voltage adjustment circuit,
wherein the fast response type voltage control circuit generates a proportional coefficient by calculating sensitivity between reactive power and the voltages of the target buses, generates an integral coefficient by using the proportional coefficient and an integral time, and generates a differential coefficient by using the integral coefficient and a differential time.

2. The apparatus of claim 1, wherein the fast response type voltage control circuit generates the reactive power output ratio information by using voltage comparison information, the proportional coefficient, the integral coefficient, and the differential coefficient.

3. The apparatus of claim 1, wherein the transient reduction control circuit generates the auxiliary signal by receiving a frequency deviation when the frequency of the electrical power grid is changed, the auxiliary signal being applied to the reactive power distribution circuit to correct the frequency deviation.

4. The apparatus of claim 1, wherein the voltage adjustment control circuit generates the additional auxiliary signal when the measured voltages of the target buses are changed to be equal to or greater than a preset reference voltage, the additional auxiliary signal being applied to the end voltage adjustment circuit to correct the changes of the measured voltages.

5. A method for managing voltage stability of an electrical power grid, the method comprising:
generating, by a fast response type voltage control circuit, reactive power output ratio information by using voltage information received from a plurality of target buses;
generating, by a reactive power distribution circuit, reactive power reference information based on the reactive power output ratio information, and generating end voltage adjustment information by using the reactive power reference information;
adjusting, by an end voltage adjustment circuit, an end voltage by using the end voltage adjustment information;
generating, by a transient reduction control circuit, an auxiliary signal when a frequency is changed, and providing the auxiliary signal to the reactive power distribution circuit; and
generating, by a voltage adjustment control circuit, an additional auxiliary signal by measuring voltages of the target buses, and providing the additional auxiliary signal to the end voltage adjustment circuit, wherein the generating of the reactive power output ratio information by using the voltage information received from the plurality of the target buses comprises:

generating a proportional coefficient by calculating sensitivity between reactive power and the voltages of the target buses;

generating an integral coefficient by using the proportional coefficient and an integral time;

generating a differential coefficient by using the integral coefficient and a differential time; and generating the reactive power output ratio information by using voltage comparison information, the proportional coefficient, the integral coefficient, and the differential coefficient.

6. The method of claim 5, wherein the generating of the auxiliary signal when the frequency is changed, and the providing of the auxiliary signal to the reactive power distribution circuit comprise:

generating the auxiliary signal by receiving a frequency deviation when the frequency of the electrical power rid is changed, the auxiliary signal being applied to the reactive power distribution circuit to correct the frequency deviation.

7. The method of claim 5, wherein the generating of the additional auxiliary signal by measuring the voltages of the target buses and the providing of the additional auxiliary signal to the end voltage adjustment circuit comprise:

generating the additional auxiliary signal when the measured voltages of the target buses are changed to be equal to or greater than a preset reference voltage, the additional auxiliary signal being applied to the end voltage adjustment circuit to correct the changes of the measured voltages.

\* \* \* \* \*